US008417568B2

(12) United States Patent
Nong et al.

(10) Patent No.: US 8,417,568 B2
(45) Date of Patent: Apr. 9, 2013

(54) GENERATION OF CONTEXTUAL IMAGE-CONTAINING ADVERTISEMENTS

(75) Inventors: Shuzhen Nong, Bellevue, WA (US); Ying Li, Bellevue, WA (US); Tarek Najm, Kirkland, WA (US); Li Li, Issaquah, WA (US); Zheng Chen, Beijing (CN); Hua-Jun Zeng, Beijing (CN); Benyu Zhang, Beijing (CN); Yin Li, Redmond, WA (US); Dean Carignan, Seattle, WA (US); Ying-Qing Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1660 days.

(21) Appl. No.: 11/355,634

(22) Filed: Feb. 15, 2006

(65) Prior Publication Data

US 2007/0192164 A1   Aug. 16, 2007

(51) Int. Cl.
*G06Q 30/00*   (2012.01)
(52) U.S. Cl.
USPC .................. 705/14.4; 705/14.72; 705/14.51; 705/14.73; 382/100; 382/112
(58) Field of Classification Search .................... 705/14, 705/10, 16, 14.4, 14.72, 14.73, 14.51; 382/100, 382/112
See application file for complete search history.

(56) References Cited

U.S. PATENT DOCUMENTS

| 5,060,279 | A | * | 10/1991 | Crawford et al. ............... 706/20 |
| 5,740,549 | A | * | 4/1998 | Reilly et al. ............... 705/14.42 |
| 6,311,185 | B1 | * | 10/2001 | Markowitz et al. ............. 707/10 |
| 6,560,578 | B2 | | 5/2003 | Eldering |
| 6,803,933 | B1 | * | 10/2004 | Staelin et al. .................. 347/131 |
| 7,406,434 | B1 | * | 7/2008 | Chang et al. ..................... 705/10 |
| 7,516,086 | B2 | * | 4/2009 | Chu et al. .................... 705/14.71 |
| 2001/0004733 | A1 | * | 6/2001 | Eldering ........................ 705/14 |

(Continued)

FOREIGN PATENT DOCUMENTS

| JP | 2002-015220 A | 1/2002 |
| JP | 2002-041968 A | 2/2002 |

(Continued)

OTHER PUBLICATIONS

Journal Officiel De L'Office Europeen Des Brevets, Official Journal of the European Patent Office, Amtsblattt Des Europaeischen Patentamts, OEB, Munchen, De, vol. 30, No. 11, Nov. 1, 2007, pp. 592-593.

(Continued)

*Primary Examiner* — Xuan Thai
*Assistant Examiner* — Nathan Hillery
(74) *Attorney, Agent, or Firm* — Woodcock Washburn LLP

(57) ABSTRACT

According to embodiments of the invention, an advertisement-generation system generates image-containing advertisements. The advertisement-generation system includes: at least one feature-selection guideline that specifies at least one recommended feature for image-containing advertisements based on advertiser inputs that specify at least one of advertisement-target-audience information, cost information, and advertiser-industry information; an image-clip library from which images are selected for inclusion in the image-containing advertisements; and at least one advertisement template that is based on the at least one feature-selection guideline; wherein the system automatically generates image-containing advertisements that contain one or more suggested colors that are automatically suggested based on one or more colors present on a web page that will host the image-containing advertisement.

19 Claims, 10 Drawing Sheets

U.S. PATENT DOCUMENTS

| | | | | |
|---|---|---|---|---|
| 2001/0034628 | A1* | 10/2001 | Eder | 705/7 |
| 2001/0053246 | A1* | 12/2001 | Tachibana et al. | 382/162 |
| 2002/0103704 | A1* | 8/2002 | Amano et al. | 705/14 |
| 2002/0107858 | A1* | 8/2002 | Lundahl et al. | 707/100 |
| 2002/0109729 | A1* | 8/2002 | Dutta | 345/790 |
| 2002/0194215 | A1* | 12/2002 | Cantrell et al. | 707/500 |
| 2003/0014519 | A1* | 1/2003 | Bowers et al. | 709/225 |
| 2003/0144907 | A1* | 7/2003 | Cohen et al. | 705/14 |
| 2003/0158789 | A1* | 8/2003 | Miura et al. | 705/26 |
| 2003/0233197 | A1* | 12/2003 | Padilla et al. | 702/20 |
| 2004/0101156 | A1* | 5/2004 | Kacker | 382/100 |
| 2004/0208372 | A1* | 10/2004 | Boncyk et al. | 382/181 |
| 2004/0260767 | A1* | 12/2004 | Kedem et al. | 709/203 |
| 2004/0267612 | A1* | 12/2004 | Veach | 705/14 |
| 2005/0102246 | A1* | 5/2005 | Movellan et al. | 706/12 |
| 2005/0278309 | A1* | 12/2005 | Evans et al. | 707/3 |
| 2006/0103667 | A1* | 5/2006 | Amit et al. | 345/619 |
| 2006/0224445 | A1* | 10/2006 | Axe et al. | 705/14 |
| 2006/0236231 | A1* | 10/2006 | Allen et al. | 715/517 |
| 2006/0293873 | A1* | 12/2006 | Gardner et al. | 703/11 |
| 2007/0016390 | A1* | 1/2007 | Bernardo et al. | 703/11 |
| 2007/0023662 | A1* | 2/2007 | Brady et al. | 250/338.3 |
| 2007/0143184 | A1* | 6/2007 | Szmanda | 705/14 |
| 2007/0189579 | A1* | 8/2007 | Crookham et al. | 382/100 |
| 2007/0300152 | A1* | 12/2007 | Baugher | 715/522 |
| 2008/0248015 | A1* | 10/2008 | Giordano et al. | 424/94.1 |
| 2009/0210316 | A1* | 8/2009 | Chu et al. | 705/26 |

FOREIGN PATENT DOCUMENTS

| | | |
|---|---|---|
| JP | 2002-082874 A | 3/2002 |
| JP | 2003-186899 A | 4/2003 |
| JP | 2004-138692 A | 5/2004 |
| JP | 2004-280472 A | 10/2004 |
| JP | 2005-107931 A | 4/2005 |
| JP | 2005-293279 A | 10/2005 |
| JP | 2006-033669 A | 2/2006 |

OTHER PUBLICATIONS

EP Application No. 07873866.3: Extended European Search Report, May 9, 2011, 10 pages.

* cited by examiner

| Feature Name | Feature Definition | Data Type |
|---|---|---|
| FileType | JPG, PNG, GIF, ... | String, or Integral |
| ImageSize | (width, height) | Integral (pixel) or float (proportion to web page size) |
| ImageSizeRatio | width/height | float |
| ImagePosition | (x, y) Position that the image appears relatively to the whole web page. | Integral (pixel) or float (proportion to web page size) |

Figure 5

| Feature Name | Feature Definition | Data Type |
|---|---|---|
| Average Color | AC<br>It can be calculated by averaging the R, G, B component respectively.<br>It stands for the basic color component in the image.<br>However problem is that this measure might be largely different to human perception, in this case, the average of HSV, or LUV would be better. | Vector of integral.<br>For RGB, HSV, LUV, it is $1 \times 3$, or it should be one integral for color index |
| Color Histogram | $[hc_1, hc_2, ..., hc_n]$<br>The Possibility Density Function of the color components | Vector of integral<br>Dimension=$1 \times N$, N is the number of colors |
| Major Colors | $[MC_1, MC_2, ..., MC_n]$<br>$MC_i = \begin{pmatrix} C_i \\ S_i \end{pmatrix}$, $C_i$ is the color index, and $S_i$ is the sum of the pixel with color $C_i$ | Matrix of integral,<br>Dimension = $2 \times N$, N is the number of major colors<br>Currently, N is not fixed, it relies on specific image. |
| Cumulative Color Histogram | $[CHC_1, CHC_2, ..., CHC_n]$<br>$CHC_i = \sum_{C_k \leq C_i} hc_k$<br>Possibility Distribution Function of the color components | Vector of integral<br>Dimension=$1 \times N$, N is the number of colors |
| Color Moments | $CM = [CM_1, CM_2, ..., CM_n]$<br>$CM_i = \begin{pmatrix} E_i \\ \sigma_i \\ s_i \end{pmatrix}$<br>$E_i = \frac{1}{N} \sum_{j=1}^{N} p_{ij}$<br>$\sigma_i = \left( \frac{1}{N} \sum_{j=1}^{N} (p_{ij} - E_i)^2 \right)^{\frac{1}{2}}$<br>$s_i = \left( \frac{1}{N} \sum_{j=1}^{N} (p_{ij} - E_i)^3 \right)^{\frac{1}{3}}$<br>pij, is the value of pixel (i, j) in each color dimension. | Vector of float<br>Dimension = $3 \times N$, N is the dimension of color model, such as 3 for RGB, HSV, and LUV. |
| Sub block major color | For each image I, derive a M sub-block representation:<br>$I = \bigcup_M sb_i$<br>For each block, use a index of major color to represent it.<br>$I = [MC_{sb_1}, MC_{sb_2}, ..., MC_{sb_M}]$ | Vector of integral<br>Dimension=$1 \times M$, M is the sub-block numbers |

Figure 6

| Feature Name | Feature Definition | Data Type |
|---|---|---|
| Color Entropy | $$H = \sum_{i=1}^{N} p_i \log \frac{1}{p_i}$$ $p_i = \Pr(cp_k = C_i \mid cp_k$ is the color of pixel $k, I = \cup cp_k)$ <br> Pi: the possibility of each color | Double |
| Correlogram | $$\gamma_{c_i,c_j}^{(k)}(I) \square \Pr_{p_1 \in I_{c_i}, p_2 \in I} \left[ p_2 \in I_{c_j}, \|p_1 - p_2\| = k \right]$$ $$\|p_1 - p_2\| = \max(|x_1 - x_2|, |y_1 - y_2|)$$ Which measures the joint distribution of color $c_i$ and $c_j$, with the spatial distance of k | Matrix of N×N double, N is the number of major colors. N is the same as the N in Major Color feature |

Figure 7

1. Perceptive Features

| Feature Name | Feature Definition | Data Type |
|---|---|---|
| Attention Measurement | Attention View, $$V_{att} = RECTv = ((x_v, y_v), (width, height))$$ Attention Point, $$P_{att} = \cup (x_i, y_i)^T$$ Attention Area, $$A_{att} = \cup RECTa_i$$ $$= \cup ((x_{ai}, y_{ai}), (width_i, height_i))^T$$ | $V_{att}$ is a 1×4 vector of integral (pixel) or float (relative proportion). $P_{att}$ is a set of points, its dimension is 2×Np, Np is the number of attention points. $A_{att}$ is a set of RECT, its dimension is 4×$N_a$, $N_a$ is the number of attention areas. Both $P_{att}$ and $A_{att}$ can be integral (pixel) or float (relative proportion). As well, in attention measurement, the $N_a$, $N_p$ is not fixed, it relies on specific images. |

Figure 8

| Colors in pool | | Quantitative definition | | |
|---|---|---|---|---|
| WHITE | | R = 255 | G = 255 | B = 255 |
| BLACK | | R = 0 | G = 0 | B = 0 |
| Primary | RED | R = 255 | G = 0 | B = 0 |
| | YELLOW | R = 255 | G = 255 | B = 0 |
| | BLUE | R = 0 | G = 0 | B = 255 |
| Secondary | ORANGE | R = 255 | G = 128 | B = 0 |
| | LIGHT-GREEN | R = 0 | G = 255 | B = 128 |
| | MAGENTA | R = 255 | G = 0 | B = 255 |

Figure 11

GENERATION OF CONTEXTUAL IMAGE-CONTAINING ADVERTISEMENTS

BACKGROUND

Online advertisements that contain appropriate images advantageously attract attention, foster positive feelings towards brands, and are generally more effective than advertisements that do not contain such images in persuading people to click-through the advertisements to obtain additional information about the advertised products and/or services. Online advertising platforms are increasingly considering adding image-containing advertisements to their contextual-advertising business (i.e., advertisements hosted on web pages), for example, Google™ has incorporated image-containing advertisements as an additional service in their AdSense Contextual advertisement program, and Yahoo® also added image-containing advertisement in their contextual lineup.

Different choices regarding the composition elements of an image-containing advertisement may impact differently on: (1) how much attention is attracted to an image-containing advertisement and attraction; and (2) click-through rates. For example, female users may be attracted to certain colors, while male users are attracted to different colors. The advertisers using a contextual-adverting platform may have an option to choose which words they want to target, and then choose from a wide range of colors and templates, to customize their image-composition elements, including, but not limited to size, location, dominant color, number of colors, color combination, text font, URL link location, and the like.

BRIEF SUMMARY

This Brief Summary is provided to introduce a selection of concepts in a simplified form that are further described below in the Detailed Description. This Brief Summary is not intended to identify key features or essential features of the claimed subject matter, nor is it intended to be used as an aid in determining the scope of the claimed subject matter.

According to embodiments of the invention, an advertisement-generation system generates image-containing advertisements. The advertisement-generation system includes: at least one feature-selection guideline that specifies at least one recommended feature for image-containing advertisements based on advertiser inputs that specify at least one of advertisement-target-audience information, cost information, and advertiser-industry information; an image-clip library from which images are selected for inclusion in the image-containing advertisements; and at least one advertisement template that is based on the at least one feature-selection guideline; wherein the system automatically generates image-containing advertisements that contain one or more suggested colors that are automatically suggested based on one or more colors present on a web page that will host the image-containing advertisement.

Embodiments of the invention are directed to a system that generates composition-feature-selection guidelines for image-containing advertisements. The system includes: a feature extractor that extracts features from image-containing advertisements; and an image-feature-ranking engine that: analyzes one or more relationships between the extracted features and effectiveness of the extracted images to produce one or more effectiveness grades for the features extracted from the image-containing advertisements, and generates the composition-feature-selection guidelines based on the effectiveness grades for the features extracted from the image-containing advertisements.

Embodiments of the invention are directed to a computer-readable medium containing computer-executable instructions for analyzing how effective differing compositions of design elements are for image-containing advertisements by performing steps including: analyzing the effectiveness of a plurality of differing compositions of design elements for image-containing advertisements that pertain to one or more industries to produce a plurality of effectiveness ratings that are both industry-specific and specific to design-element composition; and generating a predetermined number of image-containing-advertisement templates that are based on the plurality of effectiveness ratings.

BRIEF DESCRIPTION OF THE DRAWINGS

The foregoing Brief Summary, as well as the following Detailed Description, is better understood when read in conjunction with the accompanying drawings, which are included by way of example, and not by way of limitation, with regard to the claimed invention.

FIG. 5 is a table that sets forth file-related features in accordance with embodiments of the invention.

FIG. 6 is a table that sets forth statistics-related features in accordance with embodiments of the invention.

FIG. 7 is a table that sets forth quantitative features in accordance with embodiments of the invention.

FIG. 8 is a table that sets forth perceptive features in accordance with embodiments of the invention.

FIG. 11 is a table that shows quantitative definitions for various colors in accordance with embodiments of the invention.

DETAILED DESCRIPTION

I. Introduction

Mid-size and small advertisers may not have the resources to analyze and choose desirable advertisement-composition elements. Under such circumstances, some automated suggestion or recommendation from an image-suggestion system would be desirable. Even for large advertisers, creative, beautiful, and effective suggested image-containing advertisements may expand an advertiser's imagination and may explore design space that advertisers have not previously considered. When advertisers see beautifully composed suggested images, they may want to serve additional image-containing advertisements. Similar to search-keyword-suggestion tools that have been adopted by major paid search advertising business, an image-suggestion system may be able to effectively expand advertisers' selection and increase advertising sales.

In accordance with embodiments of the invention, a contextual-image-containing advertisement platform may provide one or more of the following services for advertisers. Analysis may be provided regarding one or more relationships between advertisement-composition features (e.g., size, color, font, and positions) and the effectiveness of the image-containing advertisements. Feature-selection guidelines may be provided for differing advertisers' respective industries, target requirements, and budgets. To encourage creativity of advertisement design, an image-clip library may be built through collecting free images available on the World Wide Web and/or by setting up an incentive system to encourage artists to contribute art clips to the image-clip library. A template library for image-containing advertisements wherein the library contains advertisement templates for different industries and/or for different advertisement-target-audience requirements. The template library may be created by data-mining modeling that analyzes the relationship between advertisements' designs and their corresponding effectiveness. Images, which may be extracted from Advertisers' web pages, may be combined with the clip library, the advertisement templates, and/or the feature-selection guidelines and may be used to automatically generate suggested image-containing advertisements for advertisers. Harmonious colors for image components may be automatically selected, and the automatically selected colors may automatically adapt to a hosting page's colors.

As such, embodiments of the invention provide advertisers with a convenient composition process for image-containing advertisements, creative design, effective selection of advertisement-composition features, and a color theme that is specific to the colors of a contextual hosting page for an image-containing advertisement. Embodiments of the invention may be used to broaden an advertiser's choices of available image-containing advertisements, facilitate the advertisement-composition process, attract more advertisement business, and increase advertisement revenue.

II. Exemplary Operating Environment

Figure 1:
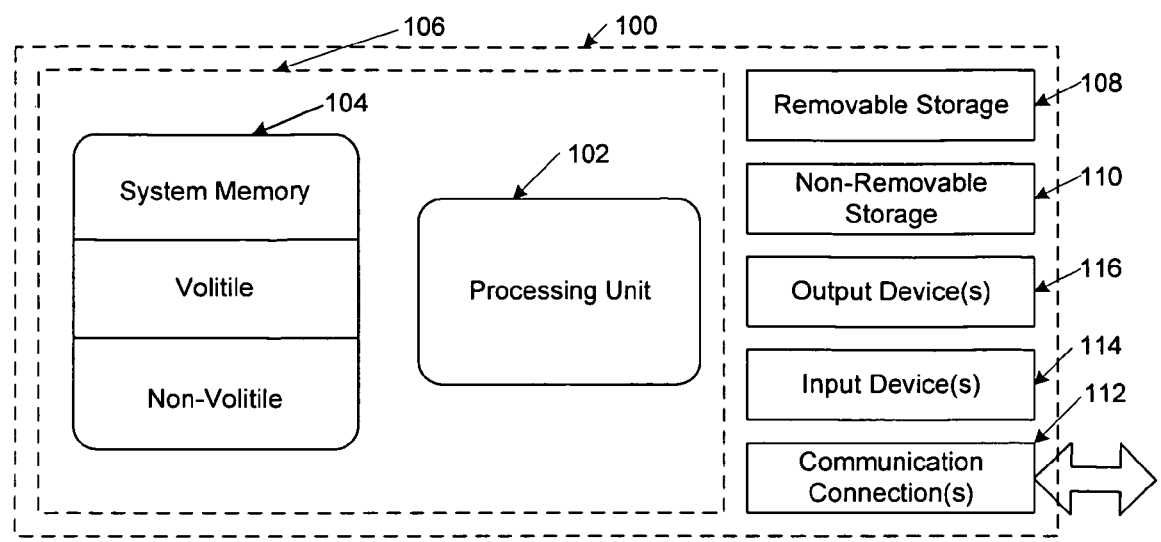
FIG. 1 shows an exemplary computer system within which embodiments of the invention may be implemented.

With reference to FIG. 1, an exemplary system for implementing embodiments of the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

III. Overview of Generating Contextual Image-Containing Advertisements

Embodiments of the invention may be used for providing suggested images for contextual image-containing advertisements. Automatically generated image-containing advertisements, which contain harmonious colors capable of automatically adapting to the colors of hosting contextual web pages, may be generated based on one or more of: at least one feature-selection guideline for image-containing advertisements, an image-clip library, and at least one image-containing-advertisement template.

Embodiments of the invention are directed to extracting features from image-containing advertisements, analyzing the relationship between the extracted features and their effectiveness, and deriving feature-selection guidelines for different industries and advertisement-target-audience preferences.

Embodiments of the invention include an incentive mechanism for encouraging artists to contribute their art work to an image-clip library. If an artist's image clip is used by an advertiser, the artist may be paid a particular amount of money per click on the image-containing advertisement. In this way, the more times the advertisements get clicked, the more money the artist makes. And the advertiser will be willing to pay the artist if the artist's work is good and results in advertisements being clicked.

Embodiments of the invention include a data-mining algorithm that analyzes at least one relationship between advertisement composition design and advertisement effectiveness. A desired number of most effective templates for an industry (and that meets any of various other preferences, such as advertisement-audience target, cost, and the like) may then be selected.

Embodiments of the invention are directed to extracting images, such as company logos, from advertisers' web pages. The extracted images may then be used as components of automatically generated suggested image-containing advertisements.

Figure 2:
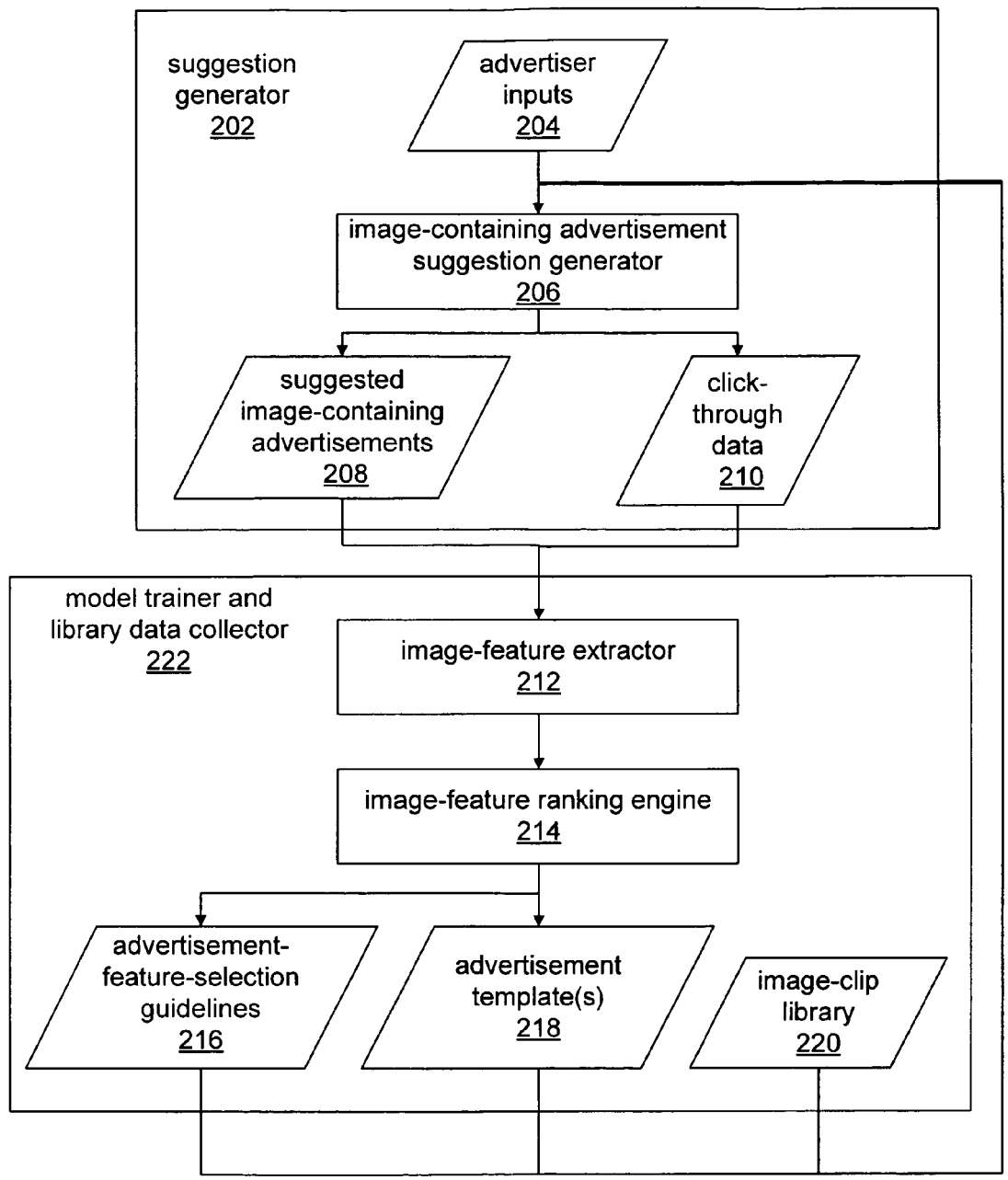
FIG. 2 shows an advertisement-generation system that generates image-containing advertisements in accordance with embodiments of the invention.

FIG. 2 shows an advertisement-generation system that generates image-containing advertisements in accordance with embodiments of the invention. A suggestion generator 202 and model trainer and library data collector 222 are shown. The suggestion generator 202 includes advertiser inputs 204, which, along with the advertisement-feature-selection guidelines 216, advertisement template(s) 218, and the image-clip library 220, are input to an image-containing advertisement suggestion generator 206. Suggested image-containing advertisements 208 and click-through data 210 that specifies click-through rates for the suggested image-containing advertisements 208 are output by the image-containing advertisement suggestion generator 206.

IV. Suggestion Generation

Figure 3:
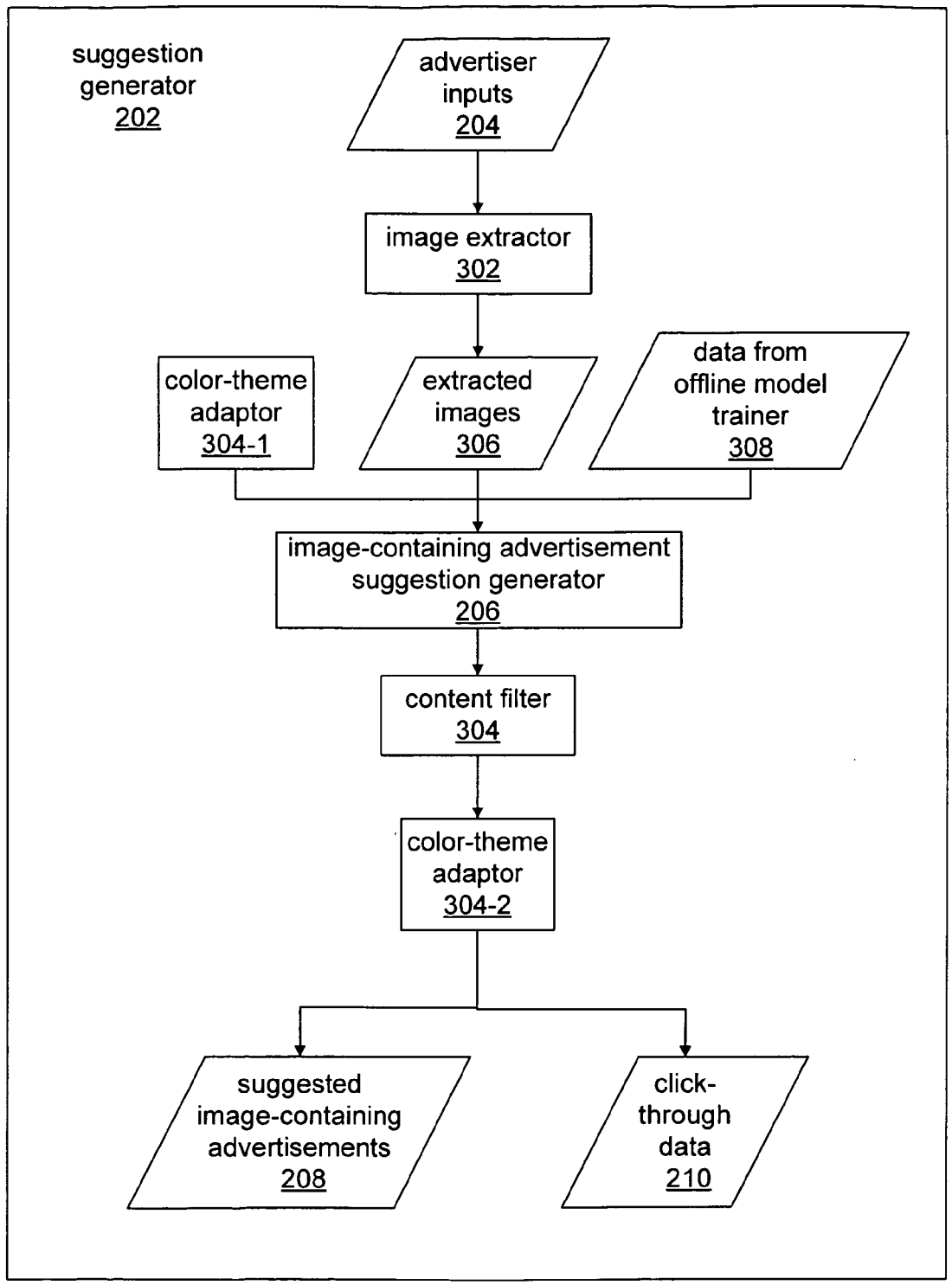
FIG. 3 shows a suggestion generator in accordance with embodiments of the invention.

FIG. 3 shows a suggestion generator 202 in accordance with embodiments of the invention. Advertiser inputs 204 may include, but are not limited to the type of product and/or services to be advertised, target-audience preferences (including, but not limited to gender, age, socioeconomic status, interests, and the like). This information may be obtained from advertisers in various ways, including, but not limited to, having advertisers enter pertinent information, such as product/service, target information, budget information, and the like, by filling out a form, or by any other suitable technique for gathering the information.

Embodiments of the invention include a web page-image extractor 302 that may extract images 306, such as company logos, from an advertiser's web pages.

An advertiser may select one or more of: a template and image components from: the images extracted from the advertiser's web pages; an image-clip library 220; and advertisement-template(s) 218. Advertisers may compose their own image advertisements in accordance with at least one feature-selection guideline 216.

Embodiments of the invention include an image-suggestion generator 206 that may automatically generate suggested image-containing advertisements 208 for an advertiser. The automatically generated image advertisements may include one or more harmonious background colors and/or component colors selected by a color-theme adaptor 304-1, the operation of which is described below.

An advertiser may then select one or more of the automatically generated image advertisements for display to users who will be viewing other online content (e.g., web pages).

Embodiments of the invention may include a content filter 304 that filters out advertisements directed to pornography and/or other indecent material.

Based on one or more colors of a contextual hosting page, the color-theme adaptor 304-2 may automatically change one or more colors of an image-containing advertisement.

When an online user clicks on an image-containing advertisement served on a hosting page, information about the image-containing advertisement, including, but not limited to, the advertisement's click-through rate 210 may be recorded and sent to an image-advertisement model trainer and library data collector 222 for use in updating offline-modeling information.

A. Image Extractor

In accordance with embodiments of the invention, an image extractor 302 may automatically extract images from an advertiser's web pages. Extracted images of this type may be used for building an images database 404 for use by the suggestion generator 202. In accordance with embodiments of the invention, three categories of images may be defined according to their relevance and functionality to advertisers' web pages. Logo images make up one image category. Dominant images is another image category. In this context, the term "dominant images" refers to images that are of relatively high quality and that pertain to the main content of an advertiser's web page. Other images in an advertiser's web pages make up the third category of images, which may be referred to as non-dominant images.

In accordance with embodiments of the invention, the classic Support Vector Machine (SVM) classification algorithm (see T. Joachims, 11 in: Making large-Scale SVM Learning Practical. Advances in Kernel Methods—Support Vector Learning, B. Schölkopf and C. Burges and A. Smola (ed.), MIT Press, 1999) may be modified based on three image-feature sets to automatically classify the images of advertisers' web pages into the three categories.

Three different feature sets may be extracted for images from advertisers' web pages. The first feature set is a content-based image feature. These features are criteria for identifying relatively high-quality images (such as dominant images) and distinct images (such as Logo images). Color moment (see M. Stricker., and M. Orengo., Similarity of Color Images. In Storage and Retrieval for Image and Video Databases, Proc. SPIE 2420, pp 381-392, 1995) may be used to represent dominant features of an image through the three moments of each color channel. Gabor filter (see B. S. Manjunath and W. Y. Ma. "Texture features for browsing and retrieval of large image data" IEEE Transactions on Pattern Analysis and Machine Intelligence, (Special Issue on Digital Libraries), Vol. 18 (8), August 1996, pp. 837-842) may be used to extract texture features from images. Gabor filter has been widely used in image retrieval and is generally considered to be efficient and effective.

The second feature set relates to physical image features. These features characterize the importance of the image from one or more physical properties, which may be useful for determining the relative importance of an image: image position in the web page; image size; and font face and size of the surrounding text in an image block.

The third feature set relates to semantic text-based features. These features may be useful for revealing a semantic meaning of the image and for helping to identify the relevance of the image and the web page: similarity of surrounding text in an image block and the main content of the web page; and similarity of image filename and the main content of the web page.

The three feature sets discussed above may be used for characterizing properties of an image according to various aspects of the image. Other than concatenating all features to one feature vector as a classifier input, three SVM models may be independently trained based on each feature set. Then a final classifier may be trained on the three SVM results to fuse the three models in a non-linear way.

B. Color Theme Adaptor

In accordance with embodiments of the invention, a color-theme adaptor 304-1 and 304-2 (collectively referred to as 304) may be used to adaptively change the colors of an image-containing advertisement so that those colors will be harmonious with one or more colors of a web page that is hosting the image-containing advertisement. For example, a foreground color (e.g., in an image-containing advertisement) may be changed when a legibility conflict (or any other type of incompatibility) is detected between a displayed background color (e.g., of a hosting page and/or a background color of an image-containing advertisement) and a displayed foreground color. The new foreground color may be selected in accordance with a predetermined legibility criterion that takes into consideration, a luminance contrast, a hue contrast, and/or a subjective classification contrast between the displayed background and foreground colors.

Figure 9:
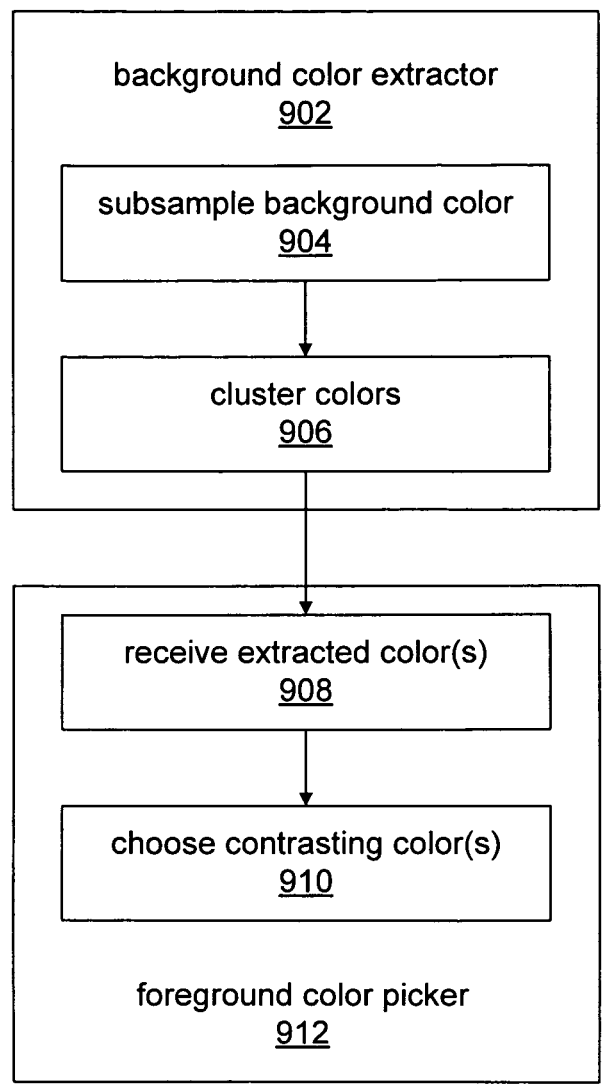
FIG. 9 illustrates examples of functional components that implement adaptive color schemes.

FIG. 9 shows functional components that comprise at least a portion of an example embodiment of color-theme adaptor 304 for adaptively changing a foreground color based on a background color.

In the example of FIG. 9, background color extractor 902 and foreground color picker 912 are shown. Background color extractor 902 may collect background colors that are significant enough to affect the legibility of similarly-colored text fonts or icons displayed thereon. Further, background color extractor 902 may cluster collected background colors that are determined to be similar to one another in accordance with at least an established criterion.

In accordance with at least one example embodiment, foreground color picker 912 may select a foreground color, such as for a text font, to provide a sufficient contrast to the colors extracted by background color extractor 902, based on an established legibility criterion.

Background color extractor 902 may subsample background colors 904, such as colors of a web page that is hosting an image-containing advertisement. To avoid processing substantially every pixel in the displayed background colors, the aforementioned subsampling may be done by a factor of $f_x$ in x axis and $f_y$ in y axis. The robustness of the processing may be increased by increasing the aforementioned sampling factors.

The parameters $f_x$ and $f_y$ may be pre-defined according to font spatial frequency. Spatial frequency relates to, at least, the metrics (e.g., character box size, ascent, descent heights, etc.) and appearance classes (e.g., italics and bold) of fonts and/or icons that may be detected on top of sampled portions of the background. For example, the background of an 8-point Tahoma-style front detected on the displayed desktop may be sampled by a sample factor $f_x=f_y=2$ for normal appearance, or $f_x=f_y=4$ if the appearance class is "bold." Such examples of sampling parameters are provided only as examples, and are not intended to be limiting. Furthermore, the parameters $f_x$ and $f_y$ do not necessarily have to be symmetrical as in the given example. Rather, the parameter values are influenced by a desire to provide a sufficient color sample while maintaining robust processing, and therefore may be subject to modification.

Background color extractor 902 may further cluster similar colors 906 that are extracted from the sampled background. The clustering may be performed using a homogeneous quantization methodology known in the art, with quantization steps $E_r=E_g=E_b=32$ in the R, G, B (red, green, blue) channels respectively. The above values of $E_r$, $E_g$, and $E_b$ are provided as examples only, and are not intended to be limiting in any manner. The average color of each cluster may be regarded as the representative color of the cluster, and the size, in terms of pixels, of the cluster may be regarded as the weight of the representative color in the background.

As stated above, similar background colors may be clustered together. As an example, to determine whether sampled background colors $C_1$ and $C_2$ are similar, consideration is given to the RGB characteristics of $C_1$ and $C_2$ (i.e., $C_1(R_1, G_1, B_1)$ and $C_2(R_2, G_2, B_2)$), as well as the above quantization steps of $E_r$, $E_g$, and $E_b$. $C_1$ and $C_2$ may be deemed be similar if $(R_1/E_1)=(R_2/E_r)$, $(G_1/E_g)=(G_2/E_g)$, and $(B_1/E_b)=(B_2/E_b)$. It is noted that, for alternative embodiments, $R_i$, $G_i$, $B_i$ are amounts of R, G, B channels of example color $C_i$ respectively and range from 0 to 255.

Foreground color picker 912 receives the background color or colors 908 extracted from the background.

Foreground color picker 912 may then enable a selection of one or more colors that sufficiently contrast the received background color or colors to provide harmonious foreground colors. To do so, foreground color picker 912 may access a color pool, which may be composed of a discrete set of colors, which are selected according to the application for which a UI is displayed.

FIG. 11 is a table that shows an example of a color pool, which consists of white, black, and primary and secondary colors in a RYB (red, yellow, blue) color wheel, in accordance with embodiments of the invention.

An example of the legibility criterion and an example technique for selecting a foreground color, as used by foreground color picker 912, are described below.

In particular, to measure legibility of foreground colors relative to the sampled background, the legibility criterion considers, at least, colorimetric and perceptional quantities. Such quantities may include luminance, hue, brightness, lightness, chroma, and saturation.

Luminance may be considered to be the amount of brightness given off by a pixel or area on a display surface. Luminance is measured in lumens. The luminance at a point of a surface and in a given direction is the quotient of the luminous intensity in the given direction of an infinitesimal element of the surface containing the point under consideration, by the orthogonally projected area of the surface element on a plane perpendicular to the given direction.

Hue may be considered to be the dominant wavelength of a color, i.e., the attribute of a color perception denoted by blue, green, red, etc.

Brightness may be considered to be the light level on the display device. In other words, brightness is the attribute of a visual sensation according to which a given visual stimulus appears to be more or less intense.

Lightness may be considered to be the attribute of a visual sensation of a display portion that appears to emit more or less light in proportion to the light emitted by a similarly illuminated area perceived as a "white" stimulus. Thus, lightness may be referred to as relative brightness.

Chroma (or "chrominance") may be considered to be the attribute of a visual sensation which permits a judgment to be made of the degree to which a chromatic stimulus differs from an achromatic stimulus of the same brightness.

Saturation may refer to the amount of blackness in a display. That is, saturation is the attribute of a visual sensation which permits a judgment to be made of the degree to which a chromatic stimulus differs from an achromatic stimulus regardless of their brightness.

More particularly, according to the example embodiments described herein, the legibility criterion are based on luminance contrast, hue contrast, and a "warm/cold" contrast.

The luminance contrast ($\Delta Y$), which may be regarded as the relative luminance between a foreground color and a background color, may be measured using the RGB parameters of the extracted foreground and background colors. $\Delta Y$ may be measured using the following formula provided by James, et al. in *Computer Graphics: Principles and Practice*, Addison-Wesley, 1995:

$$\Delta Y = |Y_{foreground} - Y_{background}|, \text{ where } Y=0.30R+0.59G+0.11B.$$

The hue contrast ($\Delta H$) may be regarded as the contrast between chromatic colors. To quantitatively measure the hue contrast, each foreground color is converted to an "HSL" (hue, saturation, lightness) color space using an algorithm provided by James, et al. The conversion of colors to the HSL color space is known in the art, and therefore a description thereof is not provided here. Thus, it is known that hue (H) ranges from 0 to 360, saturation (s) and lightness (l) range from 0.00 to 1.00. Further, chroma (c) may be approximated as follows, based on a relationship that saturation may be defined as chroma divided by lightness: $c=s \cdot (1-|l-0.5|/0.5)$. Accordingly, hue contrast may be determined by:

$$\Delta H = c_{avg} \cdot \text{Slope}\,(|H_{foreground} - H_{background}|),$$

-continued where $c_{avg} = (c_{foreground} + c_{background})/2;$ and $$\text{Slope}(d) = \begin{cases} 0, & d < 30 \\ d/360, & 30 \le d 60 \\ (d-60)/36 + 1 - 6, & 60 \le d < 90 \\ 1, & d \ge 90 \end{cases}$$

The "warm/cold" contrast (ΔW) may refer to the contrast between a foreground color and a background color based on the classification of a respective color as being "warm" or "cold." Of course, the example embodiments described herein are not beholden to terminology such as "warm" and "cold" colors. Rather, the terminology, for which alternatives may be provided, is provided to more clearly illustrate any contrast in colors provided by the embodiments described herein.

For example, "cold" colors may be blue, green, and violet, and "warm" colors may be red, yellow, and orange. The classification of these colors as being "cold" or "warm" is based on a determination of the hue, lightness, and saturation of the respective colors. For example, a light shade of green may appear to be "cold" while a darker shade of green may not, although both shades may have the same hue. The example embodiments defer to the fizzy logic depicted by L. Zedah, *Outline of a New Approach to the Analysis of Complex Systems and Decision Processes*, IEEE Transactions on Systems, Man, and Cybernetics, SMC-3, pp. 28-44, 1973., since the "cold" and "warm" characteristics of colors may be considered to be subjective.

Analytic formulas for membership functions (δ) for "warm" and "cold" colors are as follows:

$\delta_{warm}(\text{color}) = \text{gbell}_{a=90, b=4, c=60}(\text{color}.h)$ $\delta_{cold}(\text{color}) = \text{Min}(\text{Max}(\text{gbell}_{a=41.5, b=4, c=228.5}(\text{color}.h), \text{gbell}_{a=75, b=4, c=255}(\text{color}.h)), \text{gbell}_{a=0.2, b=4, c=1})$ wherein, $\text{gbell}_{a,b,c}(x) = \{1/[1+((x-c)/a)^{2b}]\}.$ Based on the membership functions, an example of quantitative definitions of "warm" and "cold" colors are as follows:

According to one example embodiment, black may be regarded as a "cold" color; while white may be regarded as a "warm" color when accompanying yellow, but alternatively may be regarded as a "cold" color when accompanying cyan.

With regard to chromatic colors, the "warm/cold" contrast ΔW may be defined as follows:

$$\Delta W = \begin{cases} 1, & \text{Classification}_{foreground} \ne \text{Classification}_{background} \\ 0.5 & \text{ForegroundOrBackgroundNoClassification} \\ 0, & \text{Classification}_{foreground} = \text{Classification}_{background} \end{cases}$$

The legibility criterion (L), according to at least one example embodiment, is based on luminance contrast, hue contrast, and "warm/cold" contrast. More particularly, $L(C_{foreground}, C_{background})$ may be regarded as the legibility value with regard to a foreground color candidate ($C_{foreground}$), from the aforementioned color pool, and an extracted background color ($C_{background}$). $L(C_{foreground}, C_{backgroud})$ may be determined as follows:

$L(C_{foreground}, C_{background}) = w_y \cdot \Delta Y + w_h \cdot \Delta H + w_w \cdot \Delta W.$ $w_y$, $w_h$, and $w_w$ are weights respectively corresponding to the luminance contrast, hue contrast, and "warm/cold" contrast.

By the example embodiment, if the value $L(C_{foreground}, C_{background})$ exceeds a predetermined threshold value, the contrast between foreground color candidate ($C_{foreground}$) and extracted background color ($C_{background}$) is deemed to be sufficient to provide a legible UI experience to a user. That is, if $L(C_{foreground}, C_{background}) >$ (predetermined threshold value), $C_{foreground}$ is readable over $C_{background}$. Conversely, if $L(C_{foreground}, C_{background}) <$ (predetermined threshold value), the contrast between foreground color candidate ($C_{foreground}$) and extracted background color ($C_{background}$) is deemed to be insufficient to provide a legible UI experience to a user, and therefore another candidate for $C_{foreground}$ should be considered.

The aforementioned predetermined threshold value may be a configurable parameter, predetermined by experimentation. The threshold value may be configured in accordance with a subjective standard of acceptable contrast between a displayed background color and foreground color. Thus, as a desired contrast between the displayed background and foreground colors increases, the lower the threshold value becomes.

By way of example, foreground color picker 912 may determine $L(C_{foreground}, C_{background})$ for color pool candidates for $C_{foreground}$ and extracted an background color $C_{background}$. Each color pool candidate for $C_{foreground}$ may be assigned properties including, but not necessarily restricted to, a "score" and a "conflict number." A "score" for a particular color pool candidate $C_{foreground}$ may be considered to be a sum of legibility values of all possible pairs of ($C_{foreground}$, $C_{background}$) in which $C_{background}$ may be any of the extracted background colors. A "conflict number" for the particular color pool candidate $C_{foreground}$ may be considered to be the number of pairs of ($C_{foreground}$, $C_{background}$) for which $L(C_{foreground}, C_{background}) <$ (predetermined threshold value), i.e., ($C_{foreground}$, $C_{background}$) do not sufficiently contrast to provide a user with a legible viewing experience.

Foreground color picker 912 may pick a foreground color $C_{foreground}$ from the color pool as follows: pick the color pool candidate having a conflict number of zero; pick the color pool candidate having the highest score among multiple color pool candidates having a conflict number of zero; or pick the color pool candidate having the lowest conflict number if none of the color pool candidates have a conflict number of zero.

The legibility criterion (L) is a linear composition of more than one relation between the foreground and background colors of a viewing environment, and is provided in an attempt to emulate human perceptive requirements for legible viewing. Therefore, the weights $w_y$, $w_h$, and $w_w$ may be selected to approach the desired perception criterion. According to an example embodiment, the weights are assigned the values of $w_y=0.7$, $w_h=0.1$, and $w_w=0.3$.

Such values are provided for an example embodiment only, and are not intended to be limiting in any manner.

More particularly, the weights may be derived using a learning-based approach. For instance, using a training set of 800 pairs of colors representing sample foreground and background colors, the weights may be derived to ensure that a foreground color is picked that provides sufficient contrast to an extracted background color. Further, as the training sets of colors are varied, it may become desirable to modify or update the weights in order to pick the most suitable foreground color relative to the extracted background color.

Figure 10:
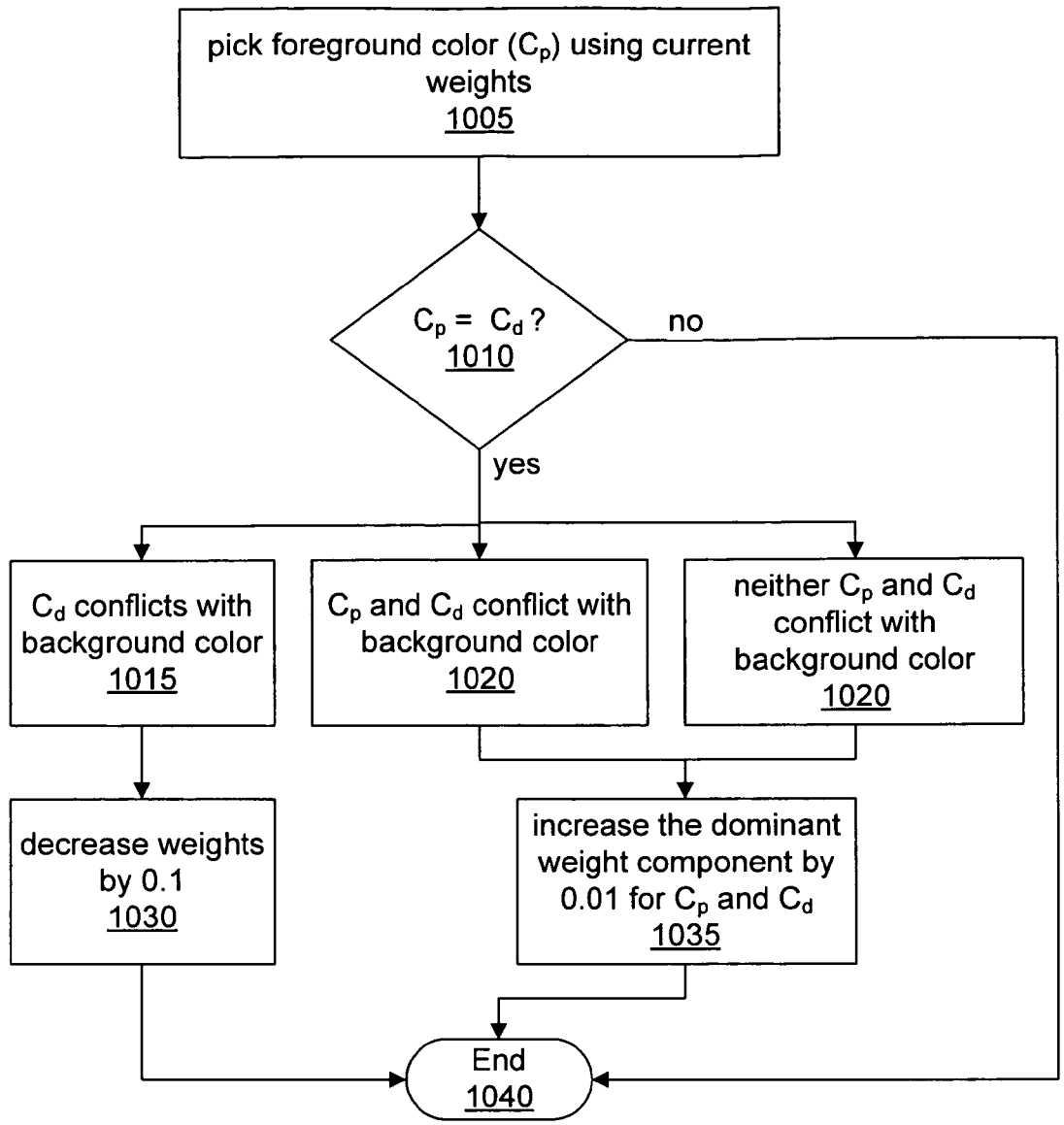
FIG. 10 illustrates a sample processing flow corresponding to at least one of the components shown in the example of FIG. 9.

FIG. 10 shows an example processing flow for modifying at least one of the weights $w_y$, $w_h$, and $w_w$ utilized to determine the legibility criterion (L). Such processing flow may be executed by foreground color picker 220 while choosing at least one contrasting color from a color pool.

According to the example processing flow shown in FIG. 10, after a foreground color $C_p$ is picked 1005 using existing weights $w_y$, $w_h$, and $w_w$, a determination 1010 is made as to whether the picked foreground color $C_p$ is the same as a color $C_d$ that is desired by a tester, for example.

If $C_p$ is determined 1010 to not be the same as $C_d$, the processing ends 1040 with the existing weights $w_y$, $w_h$, and $w_w$ being maintained.

However, if $C_p$ is determined 1010 to be the same as $C_d$, at least three different scenarios may result in any one of the weights $w_y$, $w_h$, and $w_w$ being modified.

If it is determined 1015 that the picked color $C_p$ has no conflict with the extracted background color but that the desired color $C_d$ does have such a conflict, all of weights $w_y$, $w_h$, and $w_w$ may be modified 1030 by a reduced value of 0.1. The weight modification processing then ends 1040.

If it is determined 1020 that both the picked color $C_p$ and the desired color $C_d$ do have a conflict with the extracted background color, or if it is determined that neither of $C_p$ and $C_d$ have a conflict with the extracted background color, all of weights $w_y$, $w_h$, and $w_w$ may be modified 1035 by reducing the largest of the weights $w_y$, $w_h$, and $w_w$ for the respective colors $C_p$ and $C_d$ by 0.01.

Accordingly, the foreground colors, such as those of an image-containing advertisement hosted on a web page, may be adapted to provide sufficient harmony with respect to corresponding background colors of a hosting web page. The example embodiments described herein may be modified so as to adaptively change displayed background colors, in a similar manner that foreground colors may be adaptively changed according to the example embodiments described above.

V. Advertisement Format Feature Recommendation

Figure 4:
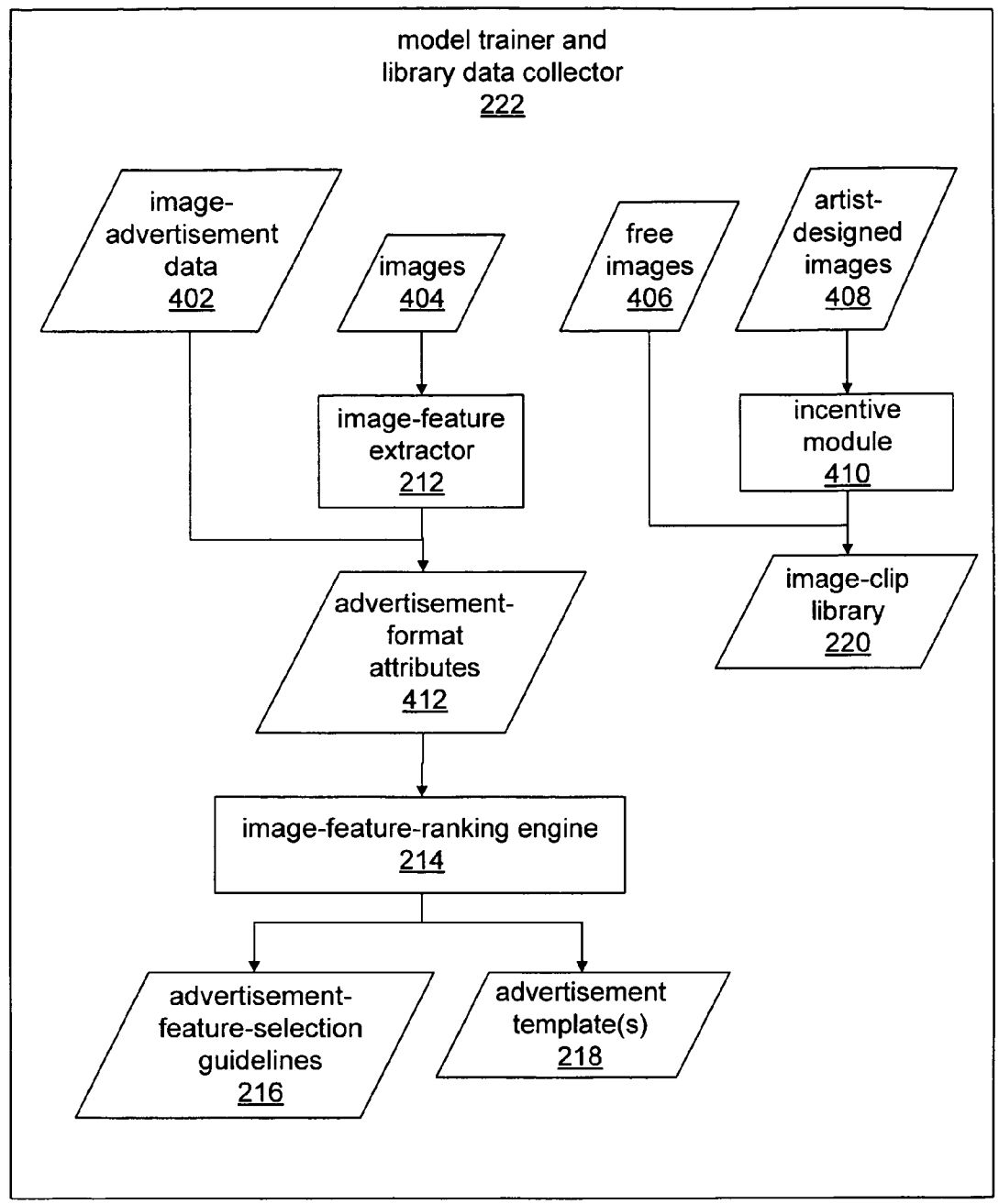
FIG. 4 show a model trainer and library data collector in accordance with embodiments of the invention.

FIG. 4 show a model trainer and library data collector 222 in accordance with embodiments of the invention. Images 404 are input to the image-feature extractor 212. Image-advertisement data 402 and the output of the image-feature extractor are combined to form advertisement format attributes 412, which are input to the image-feature ranking engine 214. Advertisement-feature-selection guidelines 216 and one or more advertisement templates are output by the image-feature-ranking engine 214.

In accordance with embodiments of the invention, an image-feature extractor 212 may select features from one or more images. The extracted image features along with other image-advertisement data, including, but not limited to, advertiser information, advertisement-target-audience information, cost information, and click-through rates, may be input to the image-feature-ranking engine 214. The image-feature-ranking engine 214 may analyze the image-advertisement features and click through rates to derive one or more advertisement feature-selection guidelines 216 and one or more advertisement templates 218.

In accordance with embodiments of the invention, free image clips 406 may be collected and stored in an image clip library 220. An incentive module 410 may receive as input artist-designed images and click-through rates for advertisements that include artist-designed images 408. The incentive module may then output images to the image-clip library and information about which artists should be compensated for use of images created by them in advertisements thereby encouraging artists to submit creative art clips to the image-clip library.

Advertisement-feature-selection guidelines 216, one or more advertisement templates 218, and the image clip library 220 are then output to the suggestion generator 202 (as shown in FIG. 2).

A. Modeling of Advertisement-Image-Feature-Selection Guidelines

In accordance with embodiments of the invention, advertisement-image-feature-selection guidelines 216 may be modeled according to the following five steps.

Step 1—image analysis: extract the average color, major colors, number of colors, color histogram, color moments, color correlogram, attention points, and any other suitable image features from the advertisement images. A more detailed description of features is set forth in the tables shown in FIGS. 5-8. FIG. 5 sets forth file-related features in accordance with embodiments of the invention. FIG. 6 sets forth statistics-related features in accordance with embodiments of the invention. FIG. 7 sets forth quantitative features in accordance with embodiments of the invention. FIG. 8 sets forth perceptive features in accordance with embodiments of the invention.

Step 2—collect other advertisement features: collect from the advertisements database the clickers and non-clickers' demographic data (including, but not limited to, age and gender) and the associated industries for the advertisements.

Step 3—collect click-through data for image-containing advertisements.

Step 4—machine learning: a Multiple Linear Regression model $$\sum_{i=1}^{N} \alpha_i x_i + \sum_{j=1}^{M} \beta_j y_j = CTR$$

Where i=1, . . . , N is the index of image features extracted from Step 1; N is the total number of image features extracted from Step 1; $x_i$ is the i-th image feature extracted from Step 1; $\alpha_i$, is the i-th coefficient associated with the i-th image feature; j=1, . . . ,M is the index of other advertisement features collected from Step 2; M is the total number of other advertisement features collected from Step 2; $y_j$ is the j-th other ad features collected from Step 2; $\beta_j$ is the j-th coefficient associated with the j-th ad feature; and CTR is the click through rate of the advertisements.

Using a Multiple Linear Regression model, the following operations may be performed: (a) select features affecting the CTR for particular demographic features and advertisment industries: using the t-test in the Multiple Linear Regression model, find out which features are significant in affecting the CTR. For example, the number of colors may be a significant feature; (b) analyze how the significant features affect the CTR: for example, at first, increasing the number of colors in an advertisement, while other features remain unchanged, may increase the CTR. But after an optimal number of colors (e.g., approximately 10), increasing the number of colors in an advertisement, while other features remain unchanged, may reduce the CTR.

Step 5—summarize the feature selection guidelines: using the regression results from Step 4, the feature-selection guidelines for different demographic sections and industries may be summarized: for example, for females ages 18-28, using 5 colors in an advertisement would achieve the highest CTR for the entertainment industry. As will be apparent, other rules will apply for other target-audience preferences and/or industries.

B. Modeling of Advertisement-Template-Selection Guidelines

In accordance with embodiments of the invention, an algorithm for the advertisement template selection guidelines is similar to the algorithm discussed above in connection with the advertisement-feature-selection guidelines, except that in the advertisement-template-selection guidelines, higher-level-image features, such as text font, URL link location, dominant image position, and other features, which are significant components of an advertisement template, are extracted. Then, the higher-level-image features are combined with clickers' demographic data, industry data, and CTR to train a Multiple Linear Regression model. Significant features are then selected, and the template-selection guidelines may be summarized.

VII. Concluding Remarks

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An advertisement-generation system comprising a computer device configured for generating image-containing advertisements, the system comprising:
   an image extractor that extracts, via the computer device, a plurality of images from an advertisement located in a host webpage, and to derive therefrom, at least one feature-selection guideline that specifies at least one recommended feature for a suggested image-containing advertisement;
   a background color extractor that determines a legibility conflict based on analyzing a background color of the host webpage and a first color contained in the suggested image-containing advertisement, wherein analyzing the background color of the host webpage comprises executing a subsampling process upon pixels of the host webpage, the subsampling process incorporating a first sampling factor fx along a x-axis and a second sampling factor fy along a y-axis of the host webpage, the factors fx and fy defined, at least in part, according to an appearance class of at least one of a font or an icon, detected on top of a sampled portion of the background in the host webpage;
   an image-clip library from which images are selected for inclusion in the image-containing advertisements;
   at least one advertisement template that is based on the at least one feature-selection guideline; and
   an advertisement suggestion generator that automatically generates the suggested image-containing advertisement based on the at least one feature-selection guideline.

2. The advertisement-generation system of claim 1, wherein a color contained in the suggested image-containing advertisement automatically adapts to a change in the one or more colors present on the hosting web page that will host the suggested image-containing advertisement.

3. The advertisement-generation system of claim 1, wherein the suggested image-containing advertisement includes one or more images extracted from the advertisement.

4. The advertisement-generation system of claim 3, wherein the one or more images were automatically extracted from the advertisement.

5. The advertisement-generation system of claim 4, wherein the one or more images that were automatically extracted from the advertisement are classified via a Support Vector Learning algorithm modified based on multiple image-feature sets to automatically classify the plurality of images into multiple categories.

6. The advertisement-generation system of claim 1, wherein the plurality of images comprises a logo image, a dominant image, and a non-dominant image.

7. The advertisement-generation system of claim 6, wherein the dominant image pertains to the main content of the host webpage.

8. The advertisement-generation system of claim 1, wherein the at least one recommended feature is derived from at least one of a content-based image feature, a physical image feature, or a semantic text-based feature.

9. The advertisement-generation system of claim 8, wherein when derived from the physical image feature, the at least one recommended feature is derived from a first image in the plurality of images and comprises at least one of a position of the first image in the host webpage, a size of the first image, or a text size.

10. The advertisement-generation system of claim 8, wherein when derived from the semantic text-based feature, the at least one recommended feature is derived by analyzing a portion of text surrounding an image block.

11. The advertisement-generation system of claim 1, wherein analyzing the background color of the host webpage further comprises clustering colors that are substantially similar to each other.

12. The advertisement-generation system of claim 1, wherein each of the factors fx and fy is equal to a first value when the appearance class is a normal font, and each of the factors fx and fy is equal to a different value when the appearance class is a bold font.

13. The advertisement-generation system of claim 1, wherein the factors fx and fy are further defined according to a metric comprising a character box size.

14. A computer system comprising a processor that generates composition-feature-selection guidelines for image-containing advertisements, the computer system comprising:
   a feature extractor that extracts, via the processor, features from a first image, the extracted features comprising at least one of a content-based image feature, a physical image feature, or a semantic text-based feature;
   a background color extractor that determines a legibility conflict based on analyzing a background color of at least a portion of a background in a host webpage and a first color contained in a suggested image-containing advertisement, wherein analyzing the background color of the host webpage comprises executing a subsampling process incorporating a first sampling factor fx along a x-axis and a second sampling factor fy along a y-axis, the factors fx and fy defined, at least in part, according to an appearance class of at least one of a font or an icon, detected on top of a sampled portion of the background in the host webpage; and
   an image-feature-ranking engine that: analyzes one or more relationships between the extracted features and effectiveness of the extracted images to produce one or more effectiveness grades for the features extracted from the first image, and generates the composition-feature-selection guidelines based on the effectiveness grades for the features extracted from the first image.

15. The system of claim 14, wherein the composition-feature-selection guidelines specify at least one recommended composition-feature pertaining to at least one of a text font, position of an image in an image-containing advertisement, a dominant color, number of colors, color combination, and uniform-resource-locator-link location.

16. A computer-readable storage medium containing computer-executable instructions for analyzing how effective differing compositions of design elements are for image-containing advertisements by performing steps comprising:
  analyzing the effectiveness of a plurality of differing compositions of design elements for image-containing advertisements that pertain to one or more industries to produce a plurality of effectiveness ratings, wherein the analyzing comprises:
    extracting an image from at least one of the image-containing advertisements;
    detecting a background color of the extracted image by executing a subsampling process upon pixels of the extracted image, the subsampling process incorporating a first sampling factor fx along a x-axis and a second sampling factor fy along a y-axis, the factors fx and fy defined, at least in part, according to an appearance class of at least one of a font or an icon, detected on top of a sampled portion of the extracted image; and
    analyzing the extracted image to determine at least one effectiveness rating amongst the plurality of effectiveness ratings; and
  generating a predetermined number of image-containing-advertisement templates that are based on the plurality of effectiveness ratings.

17. The computer-readable storage medium of claim 16, wherein the predetermined number of image-containing-advertisement templates are generated based on at least one intended-target audience.

18. The computer-readable storage medium of claim 16, wherein the predetermined number of image-containing-advertisement templates are generated based on advertisement-cost information.

19. The computer-readable storage medium of claim 16, wherein the plurality of effectiveness ratings are generated by training a Multiple Linear Regression model.

* * * * *